(12) United States Patent
Pramod et al.

(10) Patent No.: US 11,091,193 B2
(45) Date of Patent: *Aug. 17, 2021

(54) CURRENT MODE CONTROL UTILIZING PLANT INVERSION DECOUPLING IN ELECTRIC POWER STEERING SYSTEMS

(71) Applicant: STEERING SOLUTIONS IP HOLDING CORPORATION, Saginaw, MI (US)

(72) Inventors: Prerit Pramod, Saginaw, MI (US); Julie A. Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,989

(22) Filed: Oct. 15, 2018

(65) Prior Publication Data

US 2020/0114950 A1 Apr. 16, 2020

(51) Int. Cl.
*B62D 5/04* (2006.01)
*H02K 23/04* (2006.01)
(Continued)

(52) U.S. Cl.
CPC .............. *B62D 5/0463* (2013.01); *H02P 6/06* (2013.01); *H02P 21/18* (2016.02); *H02P 21/22* (2016.02); *H02P 6/17* (2016.02); *H02P 2207/05* (2013.01)

(58) Field of Classification Search
CPC .................................. H02P 6/08; H02P 21/148
See application file for complete search history.

(56) References Cited

U.S. PATENT DOCUMENTS 4,920,306 A * 4/1990 Mard ...................... H02P 21/30
318/722
6,373,211 B1 4/2002 Henry et al.
(Continued)

OTHER PUBLICATIONS

L. Harnefors et al., "Model-Based Current Control of AC Machines Using the Internal Model Control Method," IEEE Transactions on Industry Applications, vol. 34, No. 1, Jan./Feb. 1998, pp. 133-141.
(Continued)

*Primary Examiner* — Kawing Chan
*Assistant Examiner* — Bradley R Brown
(74) *Attorney, Agent, or Firm* — Dickinson Wright PLLC

(57) ABSTRACT

A system includes a first module that: receives the output current from the electric motor as a feedback, the output current including a direct axis component and a quadrature axis component; and generates a first voltage command based on a virtual resistance value, the feedback, and a targeted frequency characteristic of the motor control system. The system includes: a second module that: receives a difference between the feedback and a commanded current; and generates a second voltage command based on an estimated inductance value, an estimated resistance value of an electric motor, the virtual resistance value, a targeted frequency response characteristic of the motor control system, and the response of the d-axis component of the output current being decoupled from the response of the q-axis component. The system includes an addition module that generates an input voltage command for the electric motor by adding the first and second voltage commands.

19 Claims, 7 Drawing Sheets

(51) Int. Cl.
*H02K 29/08* (2006.01)
*H02P 6/28* (2016.01)
*H02P 21/00* (2016.01)
*H02P 6/17* (2016.01)
*H02P 21/22* (2016.01)
*H02P 6/06* (2006.01)
*H02P 21/18* (2016.01)

(56) References Cited

U.S. PATENT DOCUMENTS

| | | |
|---|---|---|
| 6,465,975 B1 | 10/2002 | Naidu |
| 6,498,449 B1 | 12/2002 | Chen et al. |
| 6,498,451 B1 | 12/2002 | Boules et al. |
| 6,566,829 B1 | 5/2003 | Naidu et al. |
| 6,650,912 B2 | 8/2003 | Bharadwaj et al. |
| 2012/0209475 A1* | 8/2012 | Birsching ............ B62D 5/0463 701/42 |
| 2013/0285591 A1* | 10/2013 | Suzuki ...................... H02P 6/10 318/724 |
| 2015/0372623 A1* | 12/2015 | Pramod ................... H02P 21/10 318/400.02 |

OTHER PUBLICATIONS

F. Briz et al., "Analysis and Design of Current Regulators Using Complex Vectors," IEEE Industry Applications, vol. 36, No. 3, May/Jun. 2000, pp. 817-825.

\* cited by examiner

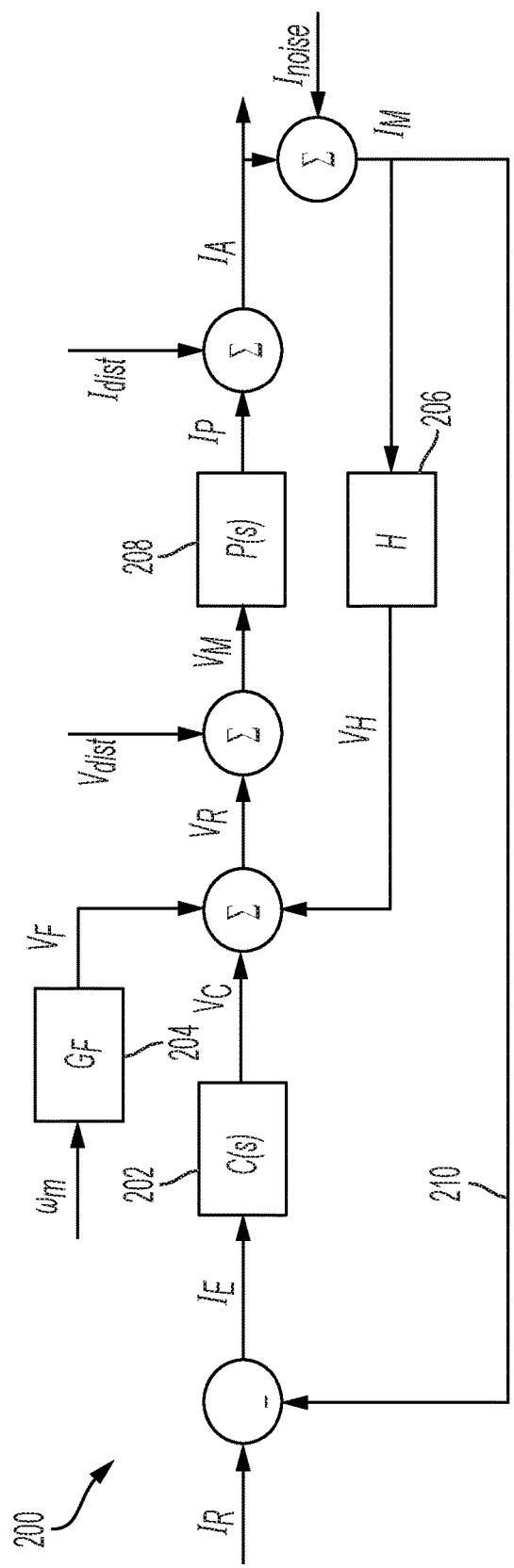
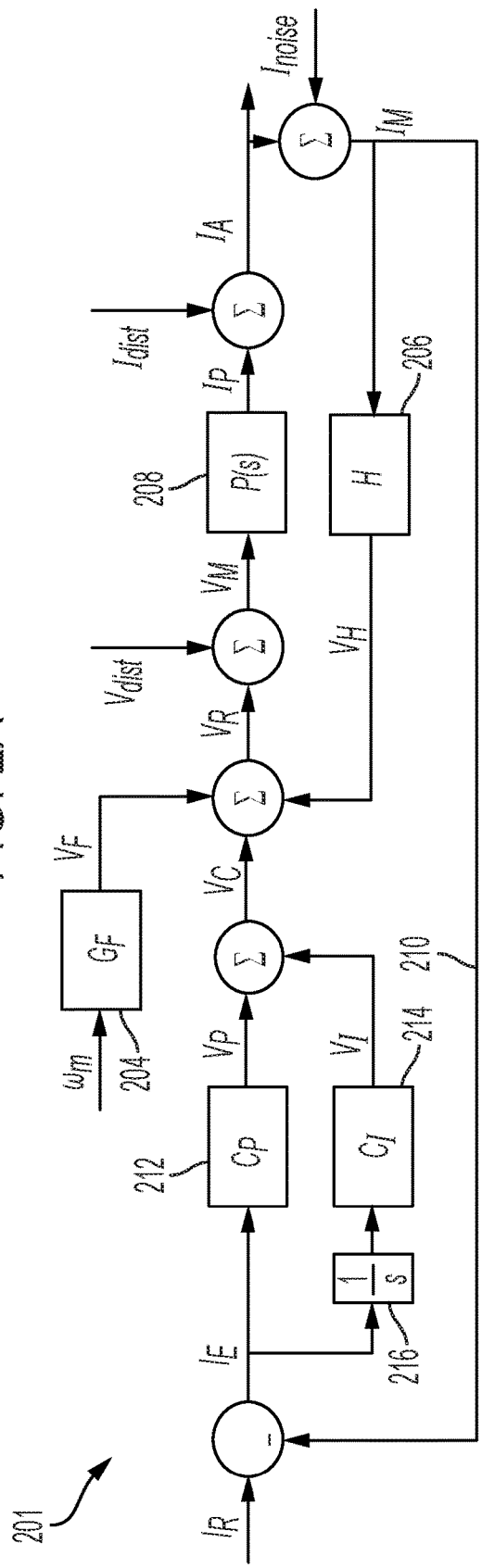
FIG. 2A
FIG. 2B

CURRENT MODE CONTROL UTILIZING PLANT INVERSION DECOUPLING IN ELECTRIC POWER STEERING SYSTEMS

BACKGROUND

The present application is generally related current mode control utilizing plant inversion decoupling in electric power steering (EPS) systems.

The output torque of a PMSM (either a surface permanent magnet (SPM) or an interior permanent magnet (IPM) motor) may be determined by a voltage command and a phase advance angle. A specific output torque of the PMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

EPS systems use an electric motor (e.g., PMSM) to provide steering assist. When using a PMSM, Field Oriented Control (FOC) is utilized, which allows an alternating current (AC) poly-phase (e.g., three-phase) motor voltage and current signals to be transformed into a synchronously rotating reference frame, commonly referred to as the d-axis/q-axis reference frame, where the motor voltages and currents become direct current (DC) quantities. The FOC torque control technique is implemented either using feedforward methods of control or a closed-loop current feedback control, or some combination of them.

Application of closed-loop current control of PMSM to EPS systems has unique and demanding requirements outside of the control system's capability to track the desired assist torque command (i.e., motor torque command) Many of these requirements are associated with a balance of the torque response behavior, motor input disturbance characteristics, current measurement noise transmission characteristics, and robustness to the accuracy of the estimated electric motor parameter estimates. Consistency of performance throughout the operating range of the control system is desired, including operation throughout the motor velocity range and operation near the supply voltage limit. Unlike high voltage power applications utilizing PMSMs, the supply voltage available for the control system from a vehicle is limited, and the motor used in these applications is typically sized as efficiently as possible to deliver steady state power requirements. This requires the current control to operate in a stable and predictable manner as the transient voltage available to the control system becomes smaller near the peak power point of PMSM operation. Therefore, the control system should be configured to operate as desired while requiring relatively small motor voltage command transients.

SUMMARY

According to one or more embodiments, motor control system that generates an output current from an input voltage includes a first module, a second module, and an addition module. The first module is configured to: receive the output current from the electric motor as a feedback, the output current including a direct axis (d-axis) component and a quadrature axis (q-axis) component; and generate a first voltage command based on a virtual resistance value, the feedback, and a targeted frequency characteristic of the motor control system. The second module is configured to: receive a difference between the feedback and a commanded current; and generate a second voltage command based on an estimated inductance value, an estimated resistance value of an electric motor, the virtual resistance value, a targeted frequency response characteristic of the motor control system, and the response of the d-axis component of the output current being decoupled from the response of the q-axis component, the motor control system being a closed-loop system. The addition module is configured to generate an input voltage command for the electric motor by adding the first voltage command and the second voltage command.

According to one or more embodiments, a steering system includes an electric motor and a motor control system. The motor control system includes a first module, a second module, and an addition module. The first module is configured to: receive the output current from the electric motor as a feedback, the output current including a direct axis (d-axis) component and a quadrature axis (q-axis) component; and generate a first voltage command based on a virtual resistance value, the feedback, and a targeted frequency characteristic of the motor control system. The second module is configured to: receive a difference between the feedback and a commanded current; and generate a second voltage command based on an estimated inductance value, an estimated resistance value of an electric motor, the virtual resistance value, a targeted frequency response characteristic of the motor control system, and the response of the d-axis component of the output current being decoupled from the response of the q-axis component, the motor control system being a closed-loop system. The addition module is configured to generate an input voltage command for the electric motor by adding the first voltage command and the second voltage command.

According to one or more embodiments, a method includes method that generates an output current from an input voltage includes receiving, by a first module, the output current from the electric motor as a feedback, the output current including a direct axis (d-axis) component and a quadrature axis (q-axis) component. The method further includes generating, by the first module, a first voltage command based on a virtual resistance value, the feedback, and a targeted frequency characteristic of the motor control system. The method further includes receiving, by the second module, a difference between the feedback and a commanded current. The method further includes generating, by the second module, a second voltage command based on an estimated inductance value, an estimated resistance value of an electric motor, the virtual resistance value, a targeted frequency response characteristic of the motor control system, and the response of the d-axis component of the output current being decoupled from the response of the q-axis component, the motor control system being a closed-loop system. The method further includes generating, by an addition module, an input voltage command for the electric motor by adding the first voltage command and the second voltage command.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIGS. 2A and 2B depict control system topologies according to one or more embodiments of the present invention;

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1A:
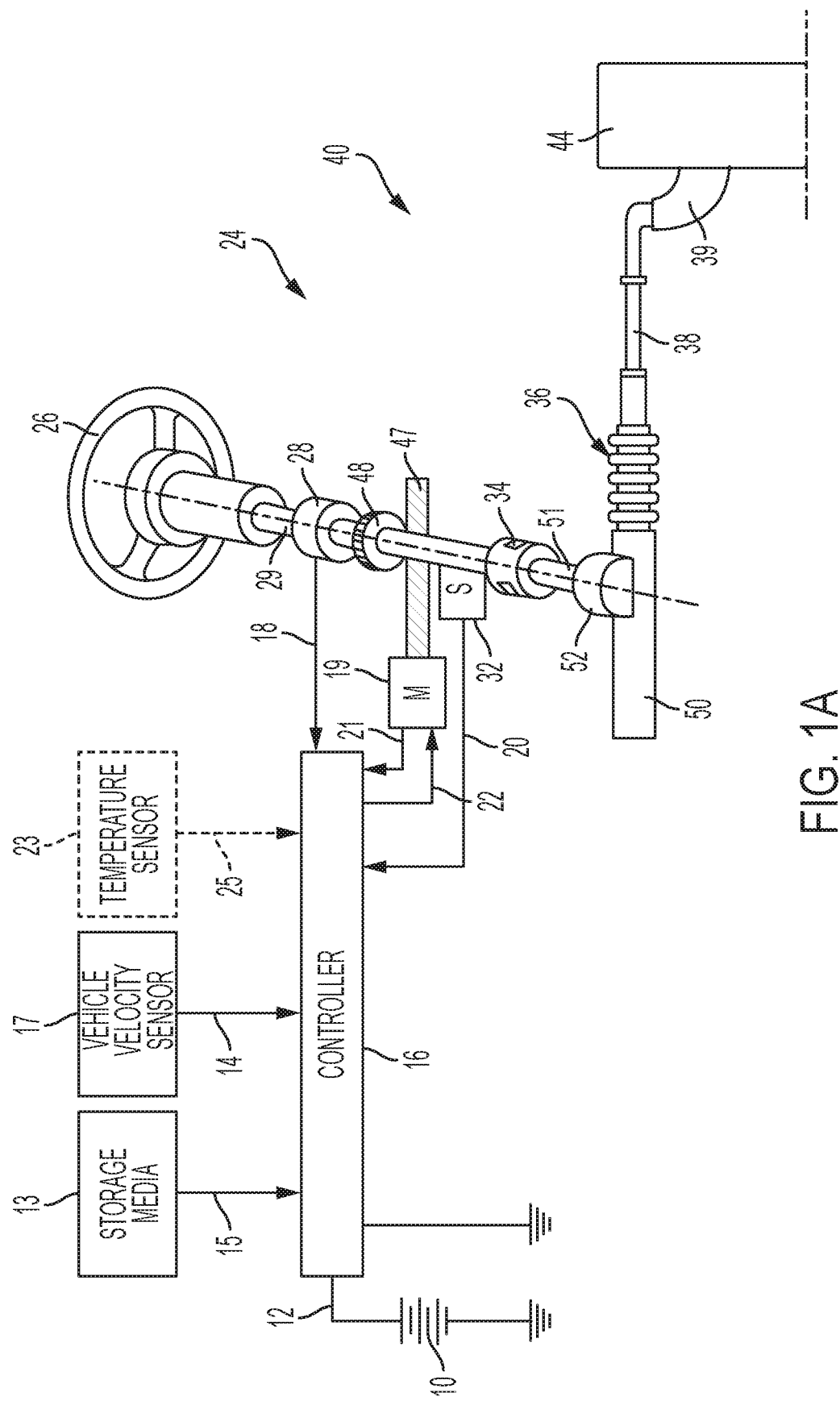
FIG. 1A is an embodiment of an electric power steering system suitable for implementation of the disclosed embodiments.

Referring now to the figures, where the technical solutions will be described with reference to specific embodiments, without limiting same, FIG. 1A is an embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefor (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 1B:
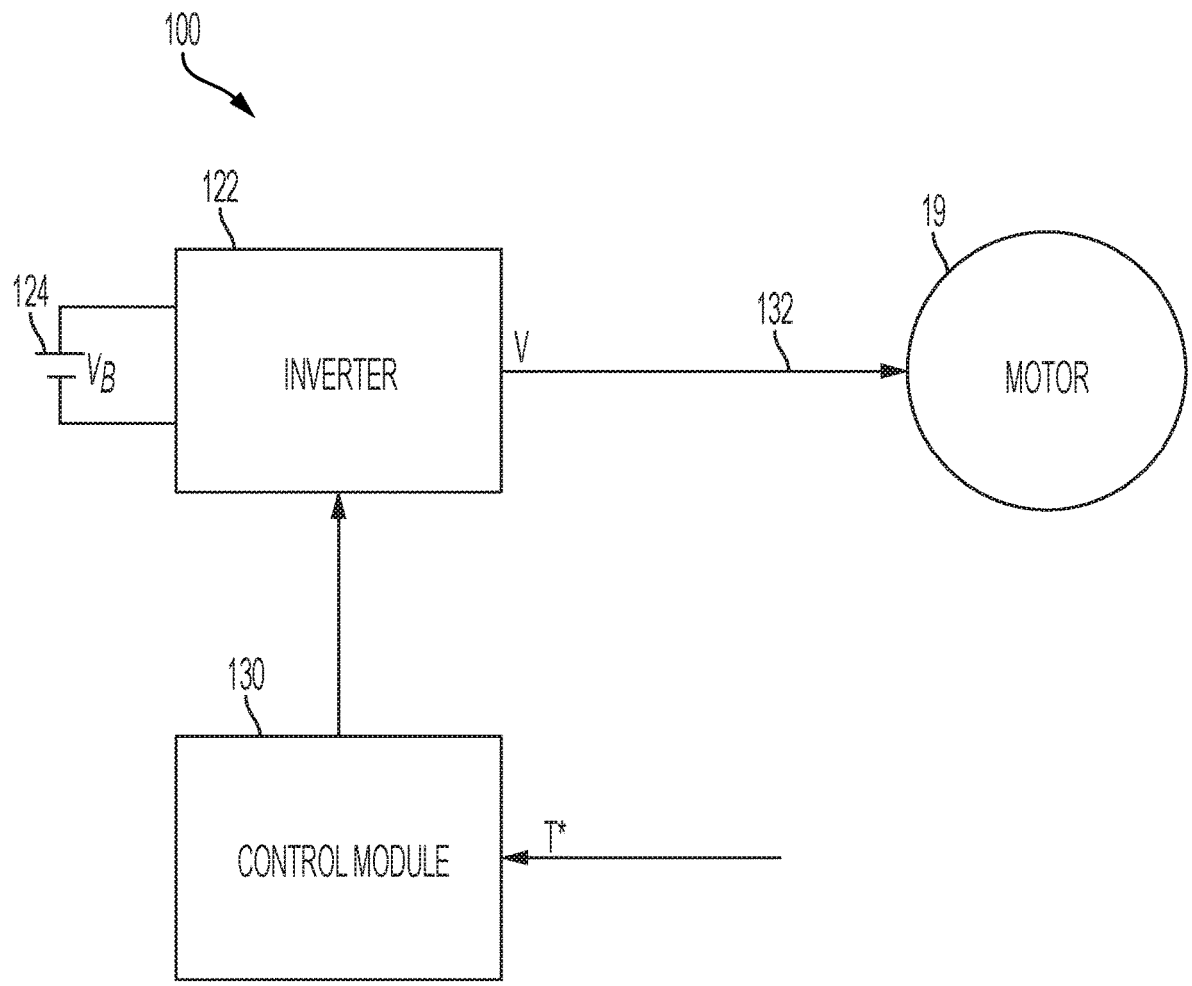
FIG. 1B is an exemplary schematic illustration of a motor control system in accordance with exemplary embodiments.

FIG. 1B illustrates a motor control system 100 in accordance with one aspect of the invention. In the exemplary embodiments as shown, the motor control system 100 includes a motor 19, an inverter 122, a supply voltage 124, and a control module 130 (also referred to as a controller). The voltage supply 124 supplies a supply voltage $V_B$ to the motor 19. In some embodiments, the voltage supply 124 is a battery. However, it is to be understood that other types of voltage supplies may be used as well. The inverter 122 is connected to the motor 19 by a plurality of connections 132 (e.g., three connectors). In some embodiments, the motor 19 is a poly-phase permanent magnet synchronous motor (PMSM). In this example, the motor 19 is a three-phase PMSM. The control module 130 is connected to the motor 19 through the inverter 122. The control module 130 receives a motor torque command T*, which may be the output of another system such as, for example, the electric power steering system (EPS) 40. The control module 130 includes control logic for sending a motor voltage V to the motor 19 through the inverter 122. Referring now to FIG. 1B, the motor 19 is operated such that a phase of the motor voltage command V shifts with respect to a phase of a developed back electromotive force (BEMF) voltage E of the motor 19. In some embodiments, an encoder (not shown) is used to measure an angular position θ of a rotor (i.e., mechanical position of the rotor) of the motor 19. The angular position θ of the motor 19 is converted to the electrical position $θ_e$ and is then used to determine the input phase voltages. The motor 19 rotates in a clockwise as well as a counterclockwise direction and produces torque in both the clockwise and counterclockwise direction during operation.

Permanent magnet synchronous machines (PMSMs), such as the motor 19 of FIGS. 1A and 1B, are ubiquitous for electric drive applications due to their advantages such as high power density, easy controllability, and improved reliability. One commonly implemented control technique for PMSMs is vector control, in which all AC signals are transformed into DC signals via a reference frame transformation. The control system is then implemented in the synchronously rotating or d/q reference frame.

According to one or more embodiments of the present invention, a technique referred to as plant inversion decoupling current control (PIDCC) is provided to improve the robustness of an EPS system to disturbances, parameter inaccuracies, and imperfect decoupling. PIDCC uses a forward path controller C(s) to perform decoupling of the d and q axes control loops while a feedback compensator H is implement to improve plant dynamics. The specific utilization of two controllers (i.e., the forward path controller and the feedback compensator) results in an overall system that possesses the desirable properties mentioned above.

In one embodiment, the forward path controller C(s) is split into parallel controllers including a proportional controller $C_P$ and an integral controller G. After C(s) is split, the compensators $C_P$ and $C_i$ are not functions of "s." The integration module 1/s is the only block of the split C(s) that contains "s." For this embodiment, the decoupling is performed by the integral controller $C_I$, and a first order closed loop response with a selectable cutoff frequency in both control loops is achieved. Higher order transfer functions for either loop can also be achieved by utilizing a different structure for the forward path controller C(s). The elements of the forward path controller C(s) for PIDCC technique may be functions of the motor velocity, machine parameters, and the desired closed loop cutoff frequencies, in which case the calibration and tuning of the control system becomes greatly simplified, while delivering consistent torque control response throughout the entire operating range of the electric motor. Additionally, this provides for control system configuration to balance multiple challenging design goals.

FIGS. 2A and 2B depict control system topologies 200, 201. FIG. 2A depicts the forward path controller C(s) 202 as a single controller, while FIG. 2B depicts the proportional controller $C_P$ 212 and the integral controller $C_I$ 214 as parallel controllers in place of the forward path controller C(s) 202.

A current reference vector $I_R$, defined as a 2×1 vector consisting of a d-axis and a q-axis component, is combined with a feedback signal 210, which represents a measured motor current vector $I_M$. The combined signal $I_E$ is fed into the forward path controller C(s) 202 (in FIG. 2A) or the proportional controller $C_P(s)$ 212 and the integral controller $C_I(s)$ 214 (in FIG. 2B) to generate a voltage command. In FIG. 2A, the voltage command is a voltage command $V_C$ from the forward path controller C(s) while in FIG. 2B, the voltage command $V_C$ is a combination of a proportional voltage command $V_P$ and an integral voltage command $V_I$ generated from the proportional controller $C_P$ 212 and the integral controller $C_I$ 214 respectively. It should be appreciated that an integration module 216 can be utilized in conjunction with the integral controller $C_I$ 214 to integrate the combined signal $I_E$. It is to be noted that each of $I_R$, $I_M$, $I_E$, $V_P$, $V_I$, and $V_C$ has a d-axis component and a q-axis component. Also, $I_R$, $I_M$, $I_E$, $V_P$, $V_I$, and $V_C$ represent vectors and not scalar values.

The voltage command $V_C$ is combined with a voltage $V_F$ from a feedforward back electromotive force (BEMF) compensation matrix 204. The feedforward BEMF compensation matrix 204 is used to compensate for slow (compared to current loop dynamics) dynamics of motor back electromotive force voltage. The voltage command $V_C$ is also combined with a voltage command $V_H$ from a feedback compensator H(s) 206. Together, the combination of the voltage command $V_C$, the voltage $V_F$, and the voltage command $V_H$ are designated as voltage command vector $V_R$, which is also defined as a 2×1 vector consisting of a d-axis and a q-axis component. The voltage command vector $V_R$ gets combined with an external disturbance voltage $V_{dist}$, having a d-axis component and a q-axis component, to generate a voltage $V_M$, which is fed into a plant transfer matrix P(s) 208. The "V" terms have a "$V_d$" and a "$V_q$" component, not "$I_d$" and "$I_q$." $V_F$ would be split into $V_{Fd}$ and $V_{Fq}$ whereas $I_M$ would be split into $I_{Md}$ and $I_{Mq}$ and so on. Note that unlike $C_P$ and $C_I$, the plant transfer matrix P(s) does not contain "s" terms.

The plant transfer matrix P(s) 208 outputs a developed motor current vector $I_P$, which gets combined with an external disturbance current $I_{dist}$ (having a d-axis component and a q-axis component) to generate a current $I_A$. The current $I_A$ gets combined with an $I_{noise}$ external disturbance current (also having a d-axis component and a q-axis component) to generate the measured motor current vector $I_M$. The measured motor current vector $I_M$ can be fed into the feedback compensator H 206 and as the feedback signal 210.

Figure 3:
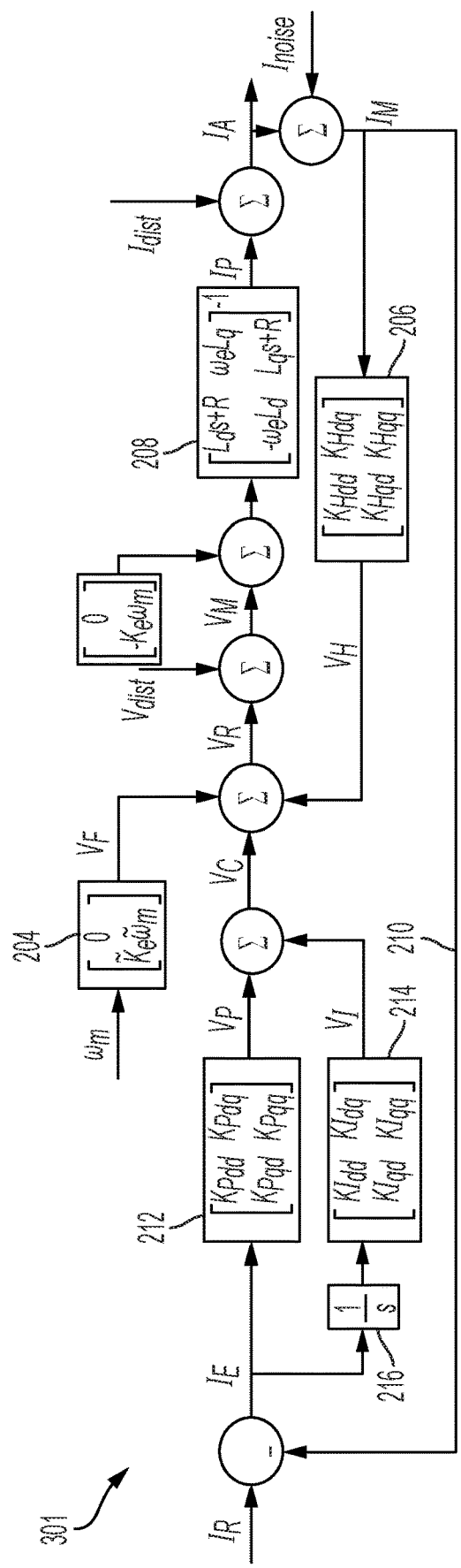
FIG. 3 depicts the control system topology FIG. 2B in more detail according to one or more embodiments of the present invention.

FIG. 3 depicts the control system topology 201 of FIG. 2B in more detail according to one or more embodiments of the present invention. It should be appreciated that the plant matrix P(s) 208 is shown as an inverse to depict how the elements of the feedback compensator H 206 affect the "effective plant" dynamics.

Traditional approaches to current mode control have utilized direct inversion decoupling control or enhanced feedback decoupling control. Direct inversion decoupling control utilizes $C_I$ to decouple the plant, and does not use H. Enhanced feedback decoupling control utilizes H to decouple the plant and enhance plant dynamics while using C(s) to obtain desired closed loop transfer function order for the two control loops. In contrast to these traditional approaches, the present techniques use plant inversion decoupling for current mode control.

The following equations defined in the d/q axis coordinate frame describe the plant transfer function (using line to neutral definitions):

$$V_d = L_d \frac{dI_d}{dt} + RI_d + \frac{N_P}{2}\omega_m L_q I_q$$

$$V_q = L_q \frac{dI_q}{dt} + RI_q - \frac{N_P}{2}\omega_m L_d I_d + K_e \omega_m$$

$$T_e = \frac{3}{2}K_e I_q + \frac{3}{4}N_P(L_q - L_d)I_d I_q$$

where $V_d$, $V_q$ are the d/q motor voltages (in Volts); $I_d$, $I_q$ are the d/q motor currents (in Amperes); $L_d$, $L_q$ are the d/q axis motor inductances (in Henries); R is the motor circuit (motor plus controller) resistance (in Ohms); $K_e$ is the motor BEMF coefficient (in Volts/rad/s); $\omega_m$ is the mechanical motor velocity (in rad/s); and $T_e$ is the electromagnetic motor torque (in Nm). It should be appreciated that the torque equation is nonlinear and represent a sum of the torque developed by leveraging the magnetic field from the permanent magnets, and the reluctance torque generated by rotor saliency (difference between $L_q$ and $L_d$) and proper choice of $I_q$ and $I_d$.

Motor parameters vary significantly during normal operation, potentially over 100% variation in R, 5-20% variation in inductances $L_d$, $L_q$, and 15-20% variation in $K_e$. R varies with build and temperature, $L_d$, $L_q$ vary due to saturation (i.e., as a function of $I_d$, $I_q$), and $K_e$ varies due to saturation (as a function of $I_q$) and with temperature. Accordingly, the above equations can be rewritten as follows:

$$V_d = L_d \dot{I}_d + RI_d + \omega_e L_q I_q$$

$$V'_q = V_q - K_e \omega_m = L_q \dot{I}_q + RI_q - \omega_e L_d I_d$$

In these rewritten equations, $$\omega_e = \frac{N_P}{2}\omega_m$$

is the electrical speed of the machine. In order to employ standard linear feedback control design techniques, the machine speed is assumed to be a slowly varying parameter. In addition, due to relatively slow flux dynamics, the quasi-static BEMF term $K_e \omega_m$ can be considered to be essentially constant, which is compensated as a disturbance in the feedforward path. These two assumptions allow linearization of these two equations for a fixed speed. Note that the apostrophe in the $V'_q$ term is dropped hereafter.

The two previous equations can be compactly rewritten using s-domain representation as follows:

$$U = P_i(s)X$$

$$\begin{bmatrix} V_d \\ V_q \end{bmatrix} = \begin{bmatrix} L_d s + R & \omega_e L_q \\ -\omega_e L_d & L_q s + R \end{bmatrix} \begin{bmatrix} I_d \\ I_q \end{bmatrix}$$

Note that this description translates plant outputs into inputs via the complex frequency transfer matrix $P_i(s)$ and is therefore the inverse of the true plant transfer matrix (i.e., the plant matrix P(s) 208) as shown in detail at block 208 of FIG. 3. The actual plant transfer matrix P(s), which converts plant inputs to outputs and is equal to the inverse of $P_i(s)$ can be written as follows:

$$X = P(s)U$$

$$\begin{bmatrix} I_d \\ I_q \end{bmatrix} =$$

$$\frac{1}{L_d L_q s^2 + R(L_d + L_q)s + R^2 + \omega_e^2 L_d L_q} \begin{bmatrix} L_q s + R & -\omega_e L_q \\ \omega_e L_d & L_d s + R \end{bmatrix} \begin{bmatrix} V_d \\ V_q \end{bmatrix} =$$

$$\frac{1}{\Delta(s)} \begin{bmatrix} L_q s + R & -\omega_e L_q \\ \omega_e L_d & L_d s + R \end{bmatrix} \begin{bmatrix} V_d \\ V_q \end{bmatrix}$$

Figure 4:
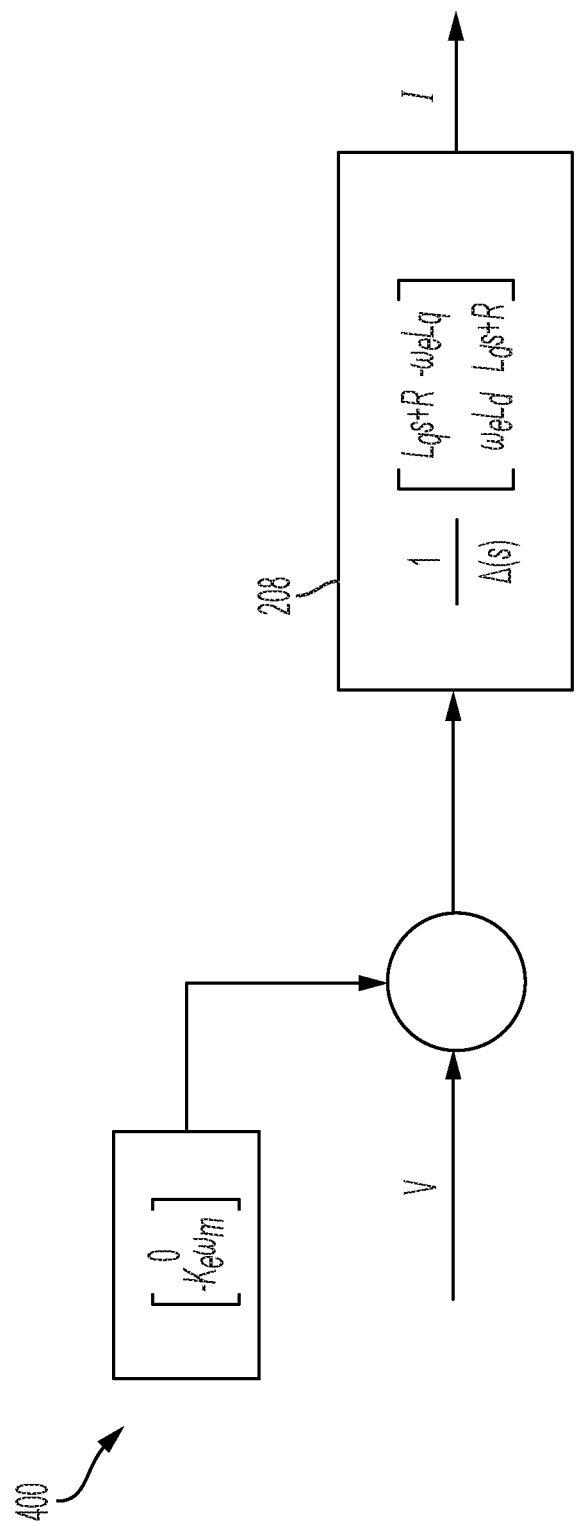
FIG. 4 depicts a block diagram of a motor (plant model) according to one or more embodiments of the present invention.

Note that the $V_q$ in the equation above is actually $V'_q = V_q - K_e \omega_m$. Accordingly, the block diagram of the plant 400 is shown in FIG. 4. This embodiment employs the transfer matrix description of the system because, in addition to achieving decoupling, it enables for employing classical techniques to analyze both loops individually. Although not shown in any of the figures, the control system 200 may include a time delay component between the voltage output of the controller $V_R$ and the actual voltage input to the motor $V_M$.

The system output response in terms of the reference inputs and disturbances, which is the closed loop transfer matrix of the system, can be obtained as follows:

$$I_A = BP_e CI_R + BP_e V_{dist} + BP_e P^{-1} I_{dist} + BP_e (H - C) I_{noise}$$

$$B = (I + P_e C)^{-1}$$

$$I_A = TI_R + T_{Di} V_{dist} + T_{Do} I_{dist} + T_{Dn} I_{noise}$$

As shown, these equations are written in terms of the effective plant matrix, which is defined as $P_e = (P^{-1} - H)^{-1}$. It should be appreciated that the effective plant can be defined as the effective transfer matrix from $V_c$ to $I_m$ if no disturbances are present. In other words, the effective plant $P_e$ is the resultant plant as observed by the forward path controller C(s) 202.

It should be appreciated that the transfer matrices involving system responses to various disturbances are not directly utilized for designing the control system. However, these transfer matrices are helpful in performing robustness and sensitivity analysis of the different control system configurations to disturbances. Thus, the following derivations are performed with disturbances nullified, and the system output can be written as follows:

$$I_A = I_M = (I + P_e C)^{-1} P_e C I_R$$

The open loop transfer matrix L, which relates to the tracking error $I_E$ to the system outputs $I_A = I_M$ can be obtained as follows:

$$I_A = P_e C I_E = L I_E$$

Further, the voltage command in the absence of disturbances is $V_r = V_m$. It should be appreciated that the closed loop and open loop transfer matrices are related as $T = (I + L)^{-1} L$. The open loop transfer matrix can therefore be written as follows:

$$L = P_e C$$

With reference to FIGS. 2A, 2B, and 3, plant inversion decoupling current control design utilizes the output forward path integral controller $C_I$ 214 to decouple the plant, and the feedback compensator H 206 to enhance plant dynamics. There are two aspects to plant inversion decoupling. First, the off-diagonal elements of the integral controller $C_I$ 214 are configured to cancel the coupling terms in the plant equations. This allows for changes in $V_q$ to control $I_q$ without affecting $I_d$ and changes in $V_d$ to control $I_d$ without affecting $I_q$.

Second, the diagonal elements of the integral controller $C_I$ 214 are configured to modify virtual resistance to the plant so that the "effective resistance" of the plant increases. The virtual resistance aids in removing the undesirable characters of direct inverse decoupling including resonances near the operating speed of the plant, sensitivity to changes in the motor circuit resistance (i.e., parameter estimation accuracy issues with the motor circuit resistance estimate) as well as other parameter estimates, and improving robustness to plant input disturbances as well as imperfect decoupling. Configuration of the values of these elements is performed carefully to achieve a balanced tradeoff between desired plant input disturbance transfer function characteristics and noise transmissibility ($I_{noise}$ to $I_A$ transfer matrix) characteristics.

In order to utilize plant inversion decoupling current control (PIDDC), it is important to derive the open loop transfer matrix in terms of the controller matrix gains, which may be done as follows:

$$P_e = \left( \begin{bmatrix} L_d s + R & \omega_e L_q \\ -\omega_e L_d & L_q s + R \end{bmatrix} - \begin{bmatrix} K_{Hdd} & K_{Hdq} \\ K_{Hqd} & K_{Hqq} \end{bmatrix} \right)^{-1}$$

$$= \frac{1}{\Delta_e(s)} \begin{bmatrix} L_q s + R - K_{Hqq} & -\omega_e L_q + K_{Hdq} \\ \omega_e L_d + K_{Hqd} & L_d s + R - K_{Hdd} \end{bmatrix}$$

$$C = \begin{bmatrix} K_{Pdd} + \frac{K_{Idd}}{s} & K_{Pdq} + \frac{K_{Idq}}{s} \\ K_{Pqd} + \frac{K_{Idq}}{s} & K_{Pqq} + \frac{K_{Iqq}}{s} \end{bmatrix} = \frac{1}{s} \begin{bmatrix} K_{Pdd} s + K_{Idd} & K_{Pdq} s + K_{Idq} \\ K_{Pqd} s + K_{Iqd} & K_{Pqq} s + K_{Iqq} \end{bmatrix}$$

$$L = PC$$

$$= \frac{1}{s \Delta_e(s)} \begin{bmatrix} L_q s + R - K_{Hqq} & -\omega_e L_q + K_{Hdq} \\ \omega_e L_d + K_{Hqd} & L_d s + R - K_{Hdd} \end{bmatrix}$$

$$\begin{bmatrix} K_{Pdd} s + K_{Idd} & K_{Pdq} s + K_{Idq} \\ K_{Pqd} s + K_{Iqd} & K_{Pqq} s + K_{Iqq} \end{bmatrix}$$

The PIDDC techniques described herein seek to utilize the forward path controller C(s) 202 (see, e.g., FIG. 2A) to perform the decoupling, while constraining the feedback compensator H 206 to enhance the closed loop properties of the overall system. This implies that the two cross-diagonal gains of the feedback compensator H 206 are directly set as $K_{Hdq} = 0$ and $K_{Hqd} = 0$. The resulting open loop transfer function is expressed as follows:

$$L = \frac{1}{s \Delta_{eff}(s)} \begin{bmatrix} L_{dd}(s) & L_{dq}(s) \\ L_{qd}(s) & L_{qq}(s) \end{bmatrix}$$

$$\Delta_e(s) = (L_d s + R - K_{Hdd})(L_q s + R - K_{Hqq}) + \omega_e^2 L_d L_q$$

$$L_{dd}(s) = (L_q s + R - K_{Hqq})(K_{Pdd} s + K_{Idd}) + (-\omega_e L_q)(K_{Pqd} s + K_{Iqd})$$

$$L_{dq}(s) = (L_q s + R - K_{Hqq})(K_{Pdq} s + K_{Idq}) + (-\omega_e L_q)(K_{Pqq} s + K_{Iqq})$$

$$L_{qd}(s) = (\omega_e L_d)(K_{Pdd} s + K_{Idd}) + (L_d s + R - K_{Hdd})(K_{Pqd} s + K_{Iqd})$$

$$L_{qq}(s) = (\omega_e L_d)(K_{Pdq} s + K_{Idq}) + (L_d s + R - K_{Hdd})(K_{Pqq} s + K_{Iqq})$$

As described herein, in order to obtain a first order closed loop response, the following is ensured:

$$L_{dd}(s) = \omega_d \Delta_{\mathit{eff}}(s)$$

$$L_{qq}(s) = \omega_q \Delta_{\mathit{eff}}(s)$$

$$L_{dq}(s) = L_{qd}(s) = 0$$

By comparing terms on both sides, it is apparent that to perform decoupling of the flux terms, the proportional gains $K_{Pdq}$, $K_{Pqd}$ are set to zero. With this, the appropriate forward path controller structure is obtained as follows:

$$C = \begin{bmatrix} K_{Pdd} + \dfrac{K_{Idd}}{s} & \dfrac{K_{Idq}}{s} \\ \dfrac{K_{Iqd}}{s} & K_{Pqq} + \dfrac{K_{Iqq}}{s} \end{bmatrix}$$

Accordingly, it can be appreciated that decoupling may be achieved using the forward path controller C(s) 202 alone without utilizing the feedback compensator H 206. The latter may be used to enhance any closed loop properties of the system however. In other words, the decoupling is achieved in a forward manner without the need to perform state feedback. In situations where the feedback compensator H 206 is not utilized, the resulting configuration becomes a one degree of freedom (1-DOF) control system. On further comparisons of the terms on both sides of the matrix, it can be seen that the cross-diagonal integral gains must be chosen as follows to perform the decoupling:

$$K_{Idq} = \omega_q \tilde{\omega}_e \tilde{L}_q$$

$$K_{Iqd} = -\omega_d \tilde{\omega}_e \tilde{L}_d$$

With the cross-diagonal integral gains chosen as shown, the forward path controller C(s) 202 is as follows:

$$C = \begin{bmatrix} K_{Pdd} + \dfrac{K_{Idd}}{s} & \omega_q \tilde{\omega}_e \tilde{L}_q \\ -\omega_q \tilde{\omega}_e \tilde{L}_d & K_{Pqq} + \dfrac{K_{Iqq}}{s} \end{bmatrix}$$

In traditional approaches using a direct inversion decoupling control technique, the feedback matrix H is not utilized at all, and the direct inversion decoupling control technique is therefore very sensitive to disturbance frequencies near the operating electrical speed of the machine and exhibits oscillatory behavior due to imperfect decoupling. Accordingly, the direct inversion decoupling control technique is not suitable for many practical applications. Embodiments of the present invention address these problems by using the feedback compensator H 206 to enhance plant dynamics, in conjunction with the forward path decoupling using the integral controller $C_I$ 214, the resultant configuration performs better than prior decoupling control configurations described in the art.

Figure 5:
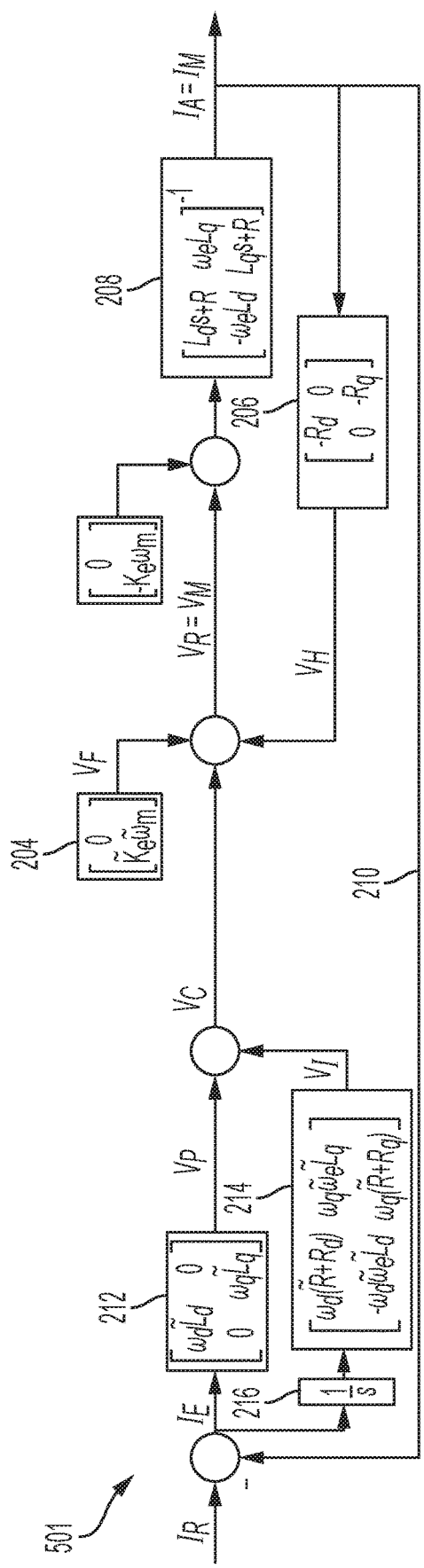
FIG. 5 depicts a block diagram of IIDC architecture according to one or more embodiments of the present invention.

An improved inversion decoupling control (IIDC) technique is now described with reference to FIG. 5. This architecture provides a decoupled motor current control system with a first order response in both the current loops. In particular, FIG. 5 depicts a block diagram of improved inversion decoupling control architecture 501 according to one or more embodiments of the present invention. In this configuration, the feedback compensator H 206 is used to introduce virtual resistances in the system. In such cases, the diagonal elements of the feedback compensator H 206 are set as follows:

$$K_{Hdd} = -R_d$$

$$K_{Hqq} = -R_q$$

where $R_d$ and $R_q$ represent the virtual resistances in the d- and q-axis.

Thereafter, the decoupling and first order response characteristics are obtained by setting the control gains of the forward path controller C(s) 202 as follows:

$$K_{Pdd} = \omega_d \tilde{L}_d$$

$$K_{Idd} = \omega_d (\tilde{R} + R_d)$$

$$K_{Pqq} = \omega_q \tilde{L}_q$$

$$K_{Iqq} = \omega_q (\tilde{R} + R_q)$$

The IIDC architecture 501 is much more robust to disturbances and imperfect decoupling in comparison to the direct inversion decoupling control approach. In fact, the performance of the IIDC approach is superior to the enhanced feedback decoupling control approach when virtual resistances are configured appropriately in terms of both responses to plant input disturbances as well as to imperfect decoupling. This directly relates to the movement of poles and zeros of various transfer matrices of the system with changing motor velocity.

Figure 6:
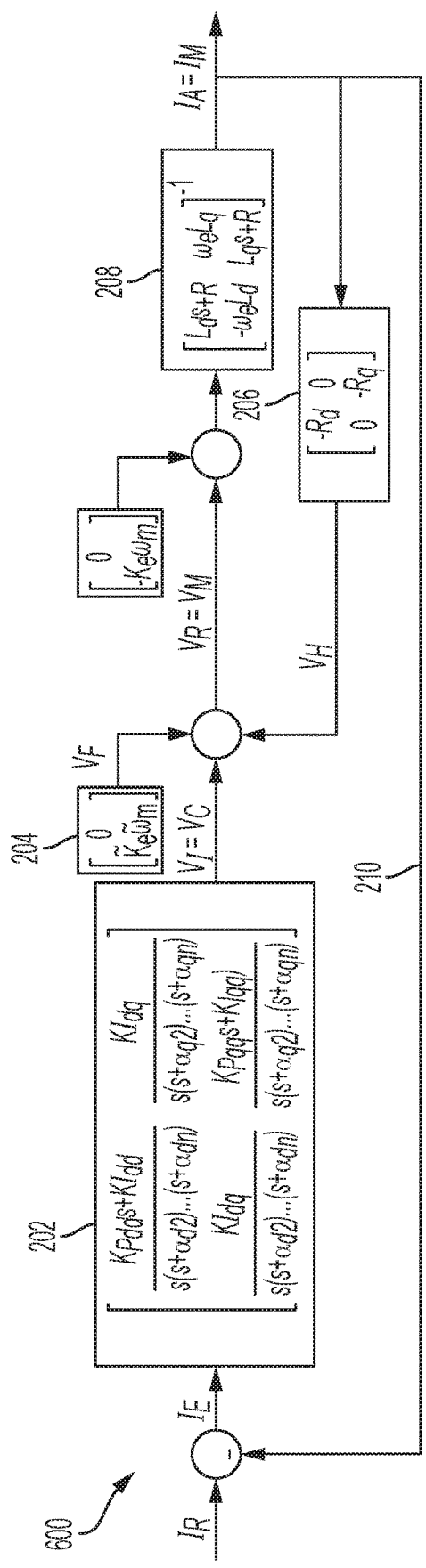
FIG. 6 depicts a block diagram of an IIDC architecture for second or higher order transfer function response according to one or more embodiments of the present invention.

Another improved inversion decoupling control technique is provided for second or higher order transfer function response. FIG. 6 depicts a block diagram of an IIDC architecture 600 for second or higher order transfer function response according to one or more embodiments of the present invention. In order to obtain a higher order transfer function in both loops, the forward path controller C(s) 202 needs to have a different structure, while the feedback compensator H remains the same as in the case of the first order response. In general, to obtain a $n^{th}$ order transfer function, the forward path controller C(s) 202 is set as follows:

$$C = \begin{bmatrix} \dfrac{K_{Pdd}s + K_{Idd}}{s(s+\alpha_{d2})\ldots(s+\alpha_{dn})} & \dfrac{K_{Idq}}{s(s+\alpha_{q2})\ldots(s+\alpha_{qn})} \\ \dfrac{K_{Iqd}}{s(s+\alpha_{d2})\ldots(s+\alpha_{dn})} & \dfrac{K_{Pqq}s + K_{Iqq}}{s(s+\alpha_{q2})\ldots(s+\alpha_{qn})} \end{bmatrix}$$

Accordingly, gains for the forward path controller C(s) 202 are selected as follows:

$$K_{Pdd} = K_d \tilde{L}_d$$

$$K_{Pqq} = K_q \tilde{L}_q$$

$$K_{Idd} = K_d (\tilde{R} + R_d)$$

$$K_{Pqq} = K_q (R + R_q)$$

$$K_{Idq} = K_q \tilde{\omega}_e \tilde{L}_q$$

$$K_{Iqd} = -K_d \tilde{\omega}_e \tilde{L}_d$$

Note that higher order refers to orders greater than or equal to second order.

When parameter estimation is ideal, the open loop transfer matrix for the higher order response case becomes:

$$L = \begin{bmatrix} \dfrac{K_d}{s(s+\alpha_{d2})\ldots(s+\alpha_{dn})} & 0 \\ 0 & \dfrac{K_q}{s(s+\alpha_{q2})\ldots(s+\alpha_{qn})} \end{bmatrix}$$

and thus the closed loop transfer matrix becomes:

$$T = \begin{bmatrix} \dfrac{K_d}{s(s+\alpha_{d2})\ldots(s+\alpha_{dn})+K_d} & 0 \\ 0 & \dfrac{K_q}{s(s+\alpha_{q2})\ldots(s+\alpha_{qn})+K_q} \end{bmatrix}$$

It should be appreciated that, in general, a $n^{th}$ order transfer function can have n distinct pole locations, which may be achieved by selecting $K_d$, $\alpha_{d2} \ldots \alpha_{dn}$, $K_q$, $\alpha_{q2} \ldots \alpha_{qn}$ appropriately. A second order transfer function for either loop may be achieved by setting $\alpha_{d3} \ldots \alpha_{dn}$ and $\alpha_{q3} \ldots \alpha_{qn}$ to zero. In an example embodiment, $n^{th}$ order responses in the closed loop transfer matrix with all closed-loop poles for each axis placed at the same location may be achieved. If both loops are configured to have such responses, the closed loop transfer matrix is expressed as follows:

$$T = \begin{bmatrix} \dfrac{\omega_d^n}{(s+\omega_d)^n} & 0 \\ 0 & \dfrac{\omega_q^n}{(s+\omega_q)^n} \end{bmatrix}$$

In this case, the characteristic polynomials in the two expressions for T in both of the two loops can be compared to ideal second order polynomials. The comparison results in equations that can be solved to obtain the required $K_d$, $\alpha_{d2} \ldots \alpha_{dn}$, $K_q$, $\alpha_{q2} \ldots \alpha_{qn}$ in terms of $\omega_d$, $\omega_q$.

Another improved inversion decoupling control technique is provided for transfer function response of different orders in both the q-axis loop and the d-axis loop. FIG. 10 depicts a block diagram of an IIDC architecture 1000 for transfer function response of different orders in both the q-axis loop and the d-axis loop according to one or more embodiments of the present invention.

The IIDC architecture 600 can be modified to achieve different closed loop transfer function orders in the two control loops (i.e., the q-axis loop and the d-axis loop). In general, in order to achieve $n^{th}$ order transfer function in the d-axis loop and $m^{th}$ order in the q-axis loop, the forward path controller structure may be expressed as follows:

$$C = \begin{bmatrix} \dfrac{K_{Pdd}s+K_{Idd}}{s(s+\alpha_{d2})\ldots(s+\alpha_{dn})} & \dfrac{K_{Idq}}{s(s+\alpha_{q2})\ldots(s+\alpha_{qm})} \\ \dfrac{K_{Iqd}}{s(s+\alpha_{d2})\ldots(s+\alpha_{dn})} & \dfrac{K_{Pqq}s+K_{Iqq}}{s(s+\alpha_{q2})\ldots(s+\alpha_{qm})} \end{bmatrix}$$

Under the assumption of ideal parameter estimation, the open loop transfer matrix is expressed as follows:

$$L = \begin{bmatrix} \dfrac{K_d}{s(s+\alpha_{d2})\ldots(s+\alpha_{dn})} & 0 \\ 0 & \dfrac{K_q}{s(s+\alpha_{q2})\ldots(s+\alpha_{qm})} \end{bmatrix}$$

and therefore the closed loop transfer matrix is expressed as follows:

$$T = \begin{bmatrix} \dfrac{K_d}{s(s+\alpha_{d2})\ldots(s+\alpha_{dn})+K_d} & 0 \\ 0 & \dfrac{K_q}{s(s+\alpha_{q2})\ldots(s+\alpha_{qm})+K_q} \end{bmatrix}$$

The parameters $K_d$, $\alpha_{d2} \ldots \alpha_{dn}$, $K_q$, $\alpha_{q2} \ldots \alpha_{qm}$ may be selected appropriately to obtain the desired closed loop transfer function orders with desired pole locations in both control loops (d-axis and q-axis) independently. As an example, in order to obtain first order and second order transfer functions in the d and q current loops respectively, the forward path controller may be expressed as follows:

$$C = \begin{bmatrix} \dfrac{K_{Pdd}s+K_{Idd}}{s} & \dfrac{K_{Idq}}{s(s+\alpha_{q2})} \\ \dfrac{K_{Iqd}}{s} & \dfrac{K_{Pqq}s+K_{Iqq}}{s(s+\alpha_{q2})} \end{bmatrix}$$

Figure 7:
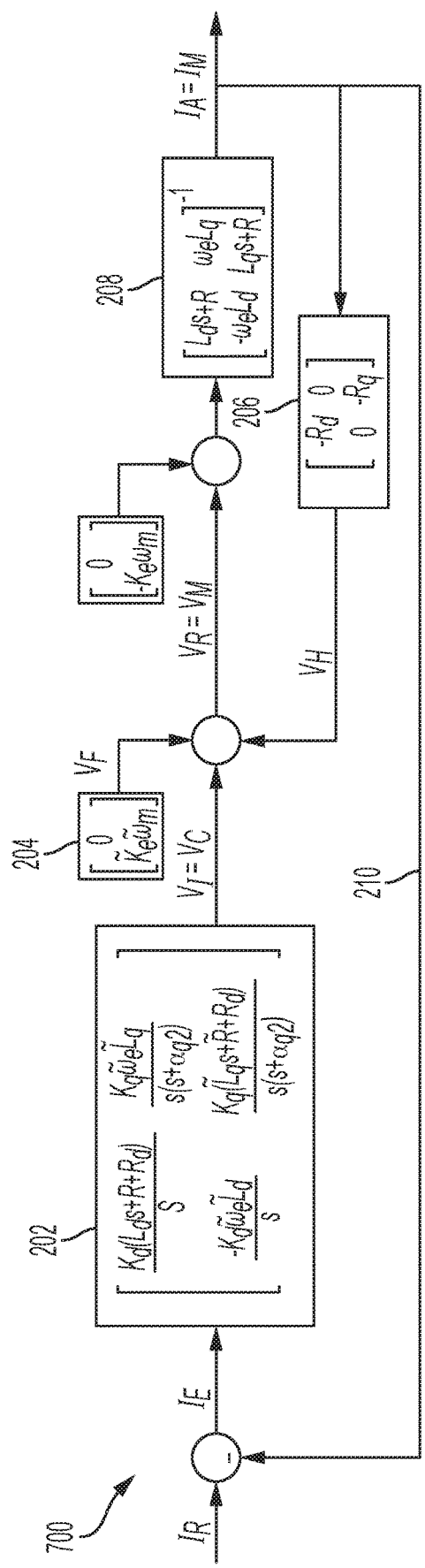
FIG. 7 depicts a block diagram of an IIDC architecture for transfer function response of different orders in both the q-axis loop and the d-axis loop according to one or more embodiments of the present invention.

Further, the forward path controller gains can be set as follows:

$K_{Pdd} = K_d \tilde{L}_d$ $K_{Pqq} = K_q \tilde{L}_q$ $K_{Idd} = K_d(\tilde{R}+R_d)$ $K_{Pqq} = K_q(R+R_q)$ $K_{Idq} = -K_q \tilde{\omega}_e \tilde{L}_q$ $K_{Iqd} = -K_d \tilde{\omega}_e \tilde{L}_d$ The controller structure and gains described above are depicted in FIG. 7. Under the assumption of perfect parameter estimation, the open loop transfer matrix for this case is expressed as follows:

$$L = \begin{bmatrix} \dfrac{K_d}{s} & 0 \\ 0 & \dfrac{K_q}{s(s+\alpha_{q2})} \end{bmatrix}$$

and the closed loop transfer matrix therefore is as follows:

$$T = \begin{bmatrix} \dfrac{K_d}{s+K_d} & 0 \\ 0 & \dfrac{K_q}{s^2+\alpha_{q2}+K_q} \end{bmatrix}$$

In order to obtain a natural frequency $\omega_q$ and a damping ration of $\xi_q$ in the q-axis closed loop, the characteristic polynomial is compared to an ideal second order polynomial $s^2+2\xi_q\omega_q s+\omega_q^2$ which gives the desired values of $K_q$ and $\alpha_{q2}$ as follows:

$$K_q = \omega_q^2$$

$$\alpha_{q2} = 2\xi_q \omega_q$$

In summary, the techniques presented here are significantly different than the prior art and are well suited for configuring a current control system to be used as part of a torque control system for PMSM for EPS applications.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

The invention claimed is:

1. A motor control system that generates an output current from an input voltage comprising:
   a processor; and
   a memory that stores instructions that, when executed by the processor, cause the processor to:
   receive the output current from an electric motor as a feedback, the output current including a direct axis (d-axis) component and a quadrature axis (q-axis) component; and
   generate a first voltage command based on a virtual resistance value, the feedback, a targeted frequency characteristic of the motor control system, and a feedback compensator defined by $$= \begin{bmatrix} -R_d & 0 \\ 0 & -R_q \end{bmatrix},$$

where $R_d$ and $R_q$ represent a d-axis component and q-axis component of the virtual resistance value and a first zero value and a second zero value represent proportional gains $K_{Pdq}$ and $K_{Pqd}$, respectively;
   receive a difference between the feedback and a commanded current;
   generate a second voltage command based on an estimated inductance value, an estimated resistance value of an electric motor, the virtual resistance value, a targeted frequency response characteristic of the motor control system, and a response of the d-axis component of the output current being decoupled from a response of the q-axis component, the motor control system being a closed-loop system, wherein the second voltage command is generated using an integral controller defined by $$\begin{bmatrix} \omega_d(\hat{R} + R_d) & \omega_q \omega_e \hat{L}_q \\ -\omega_d \omega_e \hat{L}_d & \omega_q(\hat{R} + R_q) \end{bmatrix};$$

and
   generate an input voltage command for the electric motor by adding the first voltage command and the second voltage command, wherein the input voltage causes the electric motor to generate a desired torque.

2. The motor control system of claim 1, wherein the instructions, when executed by the processor, further cause the processor to compute the virtual resistance value based on operating parameters of the electric motor.

3. The motor control system of claim 1, wherein the targeted frequency response characteristic implies a change of the output current due to a change in the commanded current.

4. The motor control system of claim 1, where the targeted frequency response characteristic is a first order low pass filter with a tunable cutoff frequency.

5. The motor control system of claim 1, where the targeted frequency response characteristic is a second order low pass filter with a tunable natural frequency and a damping ratio.

6. The motor control system of claim 1, where the targeted frequency response characteristic is a transfer function with p zeros and q poles, $p \leq q$.

7. A steering system comprising:
   an electric motor, the electric motor being a permanent magnet synchronous motor; and
   a motor control system that generates an output current from an input voltage comprising:
   a processor; and
   a memory that stores instructions that, when executed by the processor, cause the processor to:
   receive the output current from the electric motor as a feedback, the output current including a direct axis (d-axis) component and a quadrature axis (q-axis) component;
   generate a first voltage command based on a virtual resistance value, the feedback, and a targeted frequency characteristic of the motor control system;
   receive a difference between the feedback and a commanded current;
   generate a second voltage command based on an estimated inductance value, an estimated resistance value of the electric motor, the virtual resistance value, a targeted frequency response characteristic of the motor control system, and the response of the d-axis component of the output current being decoupled from the response of the q-axis component, wherein the second voltage command is generated using an integral controller defined by $$\begin{bmatrix} \omega_d(\hat{R} + R_d) & \omega_q \omega_e \hat{L}_q \\ -\omega_d \omega_e \hat{L}_d & \omega_q(\hat{R} + R_q) \end{bmatrix}$$

the motor control system being a closed-loop system; and
   generate an input voltage command for the electric motor by adding the first voltage command and the second voltage command, wherein the input voltage causes the electric motor to generate a desired torque.

8. The steering system of claim 7, wherein the instructions, when executed by the processor, further cause the processor to compute the virtual resistance value based on operating parameters of the electric motor.

9. The steering system of claim 7, wherein the targeted frequency response characteristic implies the change of the output current due to a change in the commanded current.

10. The steering system of claim 7, where the targeted frequency response characteristic is a first order low pass filter with a tunable cutoff frequency.

11. The steering system of claim 7, where the targeted frequency response characteristic is a second order low pass filter with a tunable natural frequency and a damping ratio.

12. The steering system of claim 7, where the targeted frequency response characteristic is a transfer function with p zeros and q poles, p≤q.

13. A method that generates an output current from an input voltage comprising:
receiving, by a processor, the output current from the electric motor as a feedback, the output current including a direct axis (d-axis) component and a quadrature axis (q-axis) component;
generating, by the processor, a first voltage command based on a virtual resistance value, the feedback, a targeted frequency characteristic of a motor control system, and a feedback compensator defined by $$= \begin{bmatrix} -R_d & 0 \\ 0 & -R_q \end{bmatrix}$$

where Rd and Rq represent a d-axis component and q-axis component of the virtual resistance value and a first zero value and a second zero value represent proportional gains Kpdq and Kpqd, respectively receiving, by the processor, a difference between the feedback and a commanded current;
generating, by the processor, a second voltage command based on an estimated inductance value, an estimated resistance value of an electric motor, the virtual resistance value, a targeted frequency response characteristic of the motor control system, and the response of the d-axis component of the output current being decoupled from the response of the q-axis component, the motor control system being a closed-loop system,
wherein the second voltage command is generated using an integral controller defined by $$\begin{bmatrix} \omega_d(\hat{R}+R_d) & \omega_q\omega_e L_q \\ -\omega_d\omega_e L_d & \omega_q(\hat{R}+R_q) \end{bmatrix};$$

generating, by the processor, an input voltage command for the electric motor by adding the first voltage command and the second voltage command, wherein the input voltage causes the electric motor to generate a desired torque.

14. The method of claim 13, wherein the method further comprises computing the virtual resistance value based on operating parameters of the electric motor.

15. The method of claim 13, wherein the targeted frequency response characteristic of the system implies the change of the output current due to a change in the commanded current.

16. The method of claim 13, wherein the closed-loop system includes the electric motor and the processor.

17. The method of claim 13, where the targeted frequency response characteristic is a first order low pass filter with a tunable cutoff frequency.

18. The method of claim 13, where the targeted frequency response characteristic is a second order low pass filter with a tunable natural frequency and a damping ratio.

19. The steering system of claim 7, wherein the instructions, that cause the processor to generate the first voltage command, cause the processor to generate the first voltage command using feedback matrix H(s)

$$= \begin{bmatrix} -R_d & 0 \\ 0 & -R_q \end{bmatrix},$$

where $R_d$ and $R_q$ represent a d-axis component and q-axis component of the virtual resistance value and are to be used to decouple a d-axis component and a q-axis component of the first voltage command.

* * * * *